United States Patent [19]
Wolfson et al.

[11] 3,798,706
[45] Mar. 26, 1974

[54] DETACHABLE HANDLE

[75] Inventors: Jerome T. Wolfson; Henry Lilienheim, both of Glencoe, Ill.; John Gear, Huntington, N.Y.

[73] Assignee: Business Builders International, Inc., Chicago, Ill.

[22] Filed: Oct. 18, 1972

[21] Appl. No.: 298,789

[52] U.S. Cl. ............................................. 16/114 A
[51] Int. Cl. ................................................ A47b 95/02
[58] Field of Search ........ 16/110 A, 114 A; 294/31; D7/95, 132, 85, 87

[56] References Cited
UNITED STATES PATENTS

| D204,145 | 3/1966  | Du Puy  | D7/95    |
|----------|---------|---------|----------|
| 3,157,909 | 11/1964 | Schmitt | 16/114 A |
| 429,453  | 6/1890  | Judd    | 16/110 A |
| 921,077  | 5/1909  | Brown   | 16/114 A |
| 1,268,089 | 6/1918 | Borsse  | 16/114 A |
| 1,364,552 | 1/1921 | Hill    | 16/114 A |
| 1,686,497 | 10/1928 | Olsen  | 16/114 A |
| 3,065,018 | 11/1962 | Serio  | 16/114 A X |
| 3,464,082 | 9/1969 | Friberg | 16/114 A |
| 968,585  | 8/1910  | Moore   | 294/31 R X |

*Primary Examiner*—Donald A. Griffin
*Attorney, Agent, or Firm*—Prangley, Dithmar, Vogel, Sandler & Stotland

[57] ABSTRACT

The detachable handle comprises an elongated body including a receptacle adjacent to one end thereof for removably receiving a projection which is affixed to a utensil. A cover for the receptacle is first opened to accommodate entry of the projection thereinto, whereafter the cover is closed to capture the projection in the receptacle and thereby detachably lock the handle onto the utensil.

8 Claims, 17 Drawing Figures

PATENTED MAR 26 1974 3,798,706

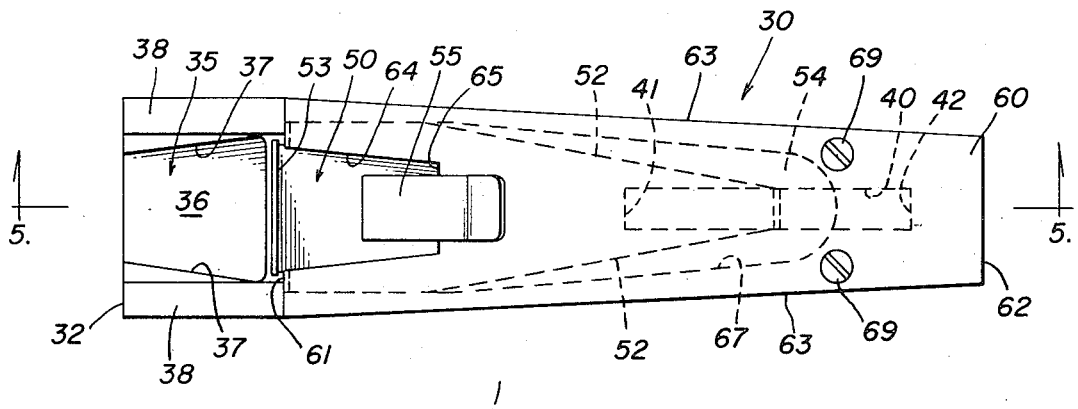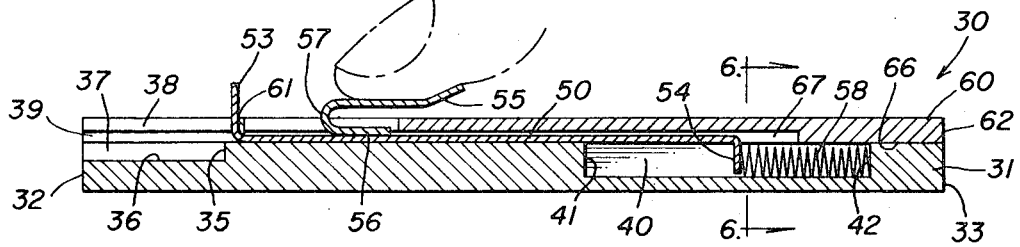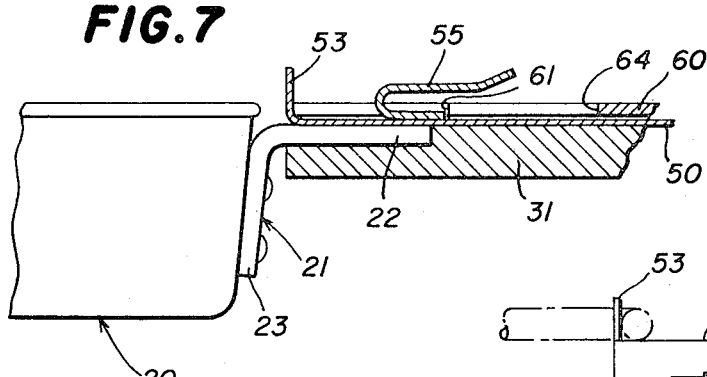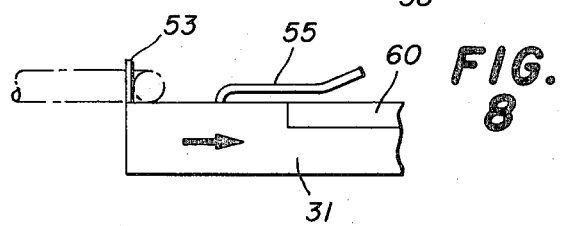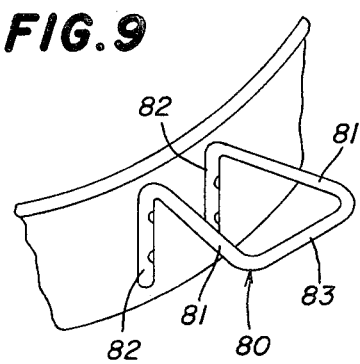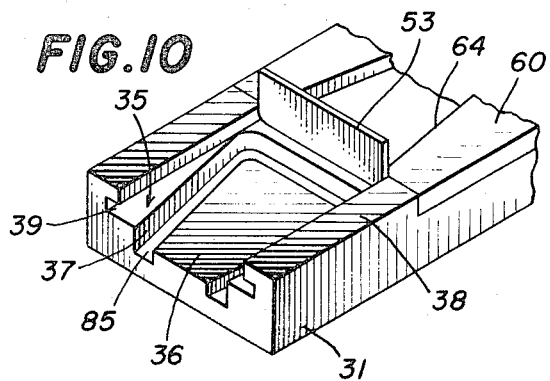

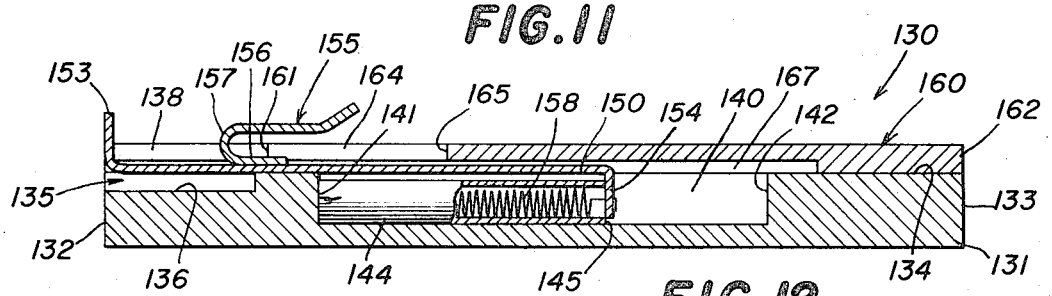
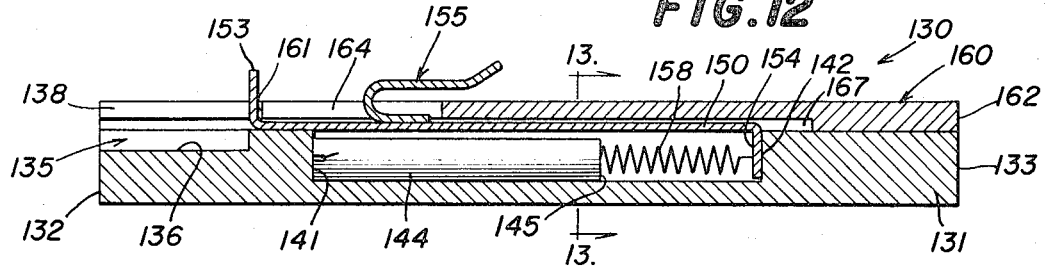
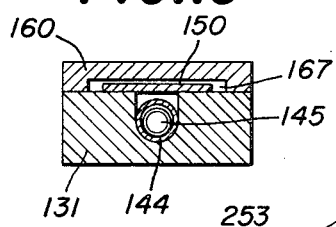
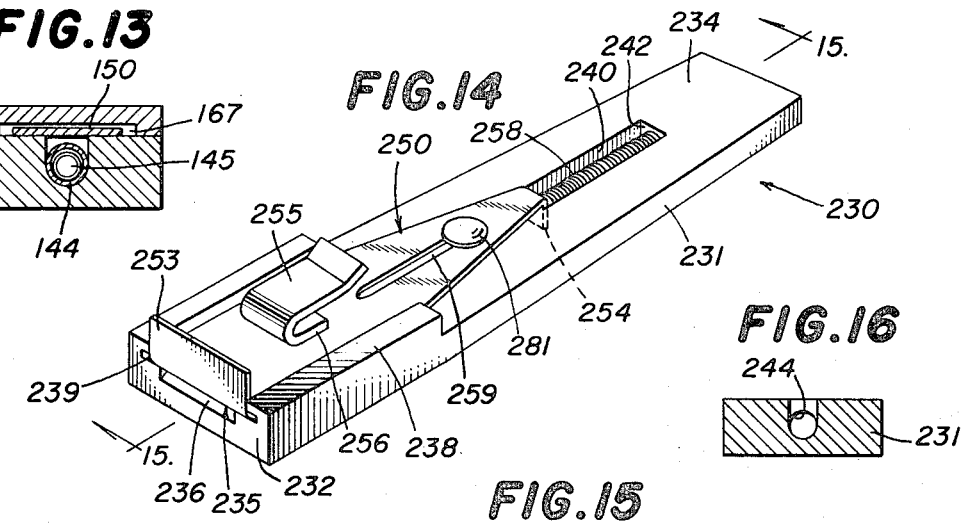
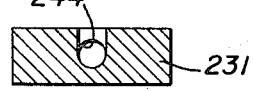
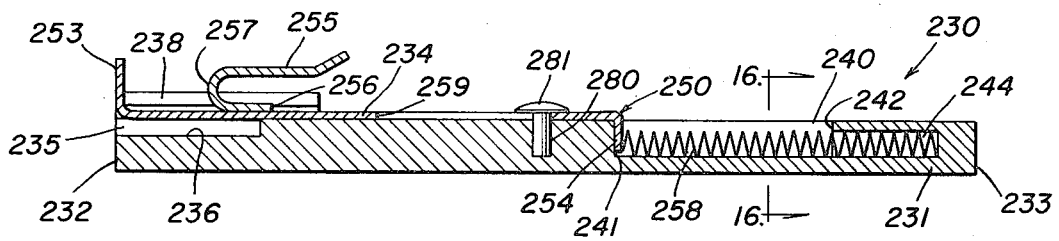
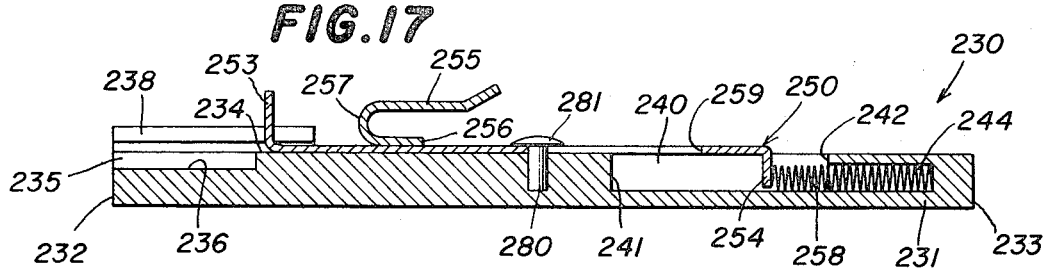

DETACHABLE HANDLE

BACKGROUND OF THE INVENTION

The present invention relates to a detachable handle for household utensils, such as pots and pans and the like.

Detachable handles have been known for interlocking with kitchen utensils, such as pots and pans. But, in attaching and detaching such handles, the user had to use both hands and to protect at least one hand against heat and burning by wearing a glove or using a pot holder. Furthermore, substantial effort had to be exerted in attaching the handle. Also, there was a tendency of the handle to be unexpectedly pulled away from the user's hand during attachment. While the handle was being attached to a frying pan, for example, the contents thereof would undesirably shift inside the pan or even be thrown from the pan. Finally, the interlocking arrangement was not sufficiently secure to insure a reliable and firm interconnection between the handle and the utensil.

SUMMARY OF THE INVENTION

It is an object of the present invention to provide a handle which can be firmly and securely attached to a utensil without the risk of becoming accidentally detached during use, while at the same time being detachable quickly and easily by deliberate and positive action.

Another object is to provide a handle which can be easily attached to and detached from a utensil by using one hand.

Still another object is to provide a handle for a hot kitchen utensil, such as a hot frying pan, which can be attached and detached without the use of a glove or the like.

Yet another object is to provide a detachable handle which is releasably and firmly secured to a utensil without application of any force to the utensil.

A further object is to provide a handle which may be attached to and detached from a pot or pan, without causing the food therein to be shifted, spilled, splattered, etc.

A still further object is to provide a detachable handle which will not snap out of the user's hand as it is being attached to a utensil.

A yet further object of the invention is to provide a detachable handle which is simple in construction, has a minimum number of parts, and is so shaped as to lend itself to a natural and comfortable grasp by the user's hand.

Another object of the invention is to provide a detachable handle having a hook to move an oven shelf or utensil.

Still another object is to provide a handle which can so firmly be attached to a utensil as to enable the user to turn the utensil upside down.

Yet another object is to provide a handle which can be detached whether the utensil is rightside up or upside down.

A further object of the invention is to provide a detachable handle which can be fully immersed in water without any damage thereto.

In summary there is provided a projection for attaching to a utensil in combination with a detachable handle, which detachable handle comprises an elongated body, the body including therein a receptacle adjacent one end thereof for removably receiving the projection, the receptacle having a mouth at one end and a laterally directed passage to accommodate movement of the projection into and out of the receptacle, a cover movable between closed and open positions with respect to the passage, the projection and the body including means for preventing withdrawal of the projection from the receptacle through the mouth, whereby placing the cover in the open position thereof enables seating of the projection in the receptacle so as to protrude from the mouth, and thereafter placing the cover in the closed position thereof causes capture of the projection in the receptacle so as detachably to lock the handle onto the utensil.

With the foregoing and other objects in view which will appear as the description proceeds, the invention consists of certain novel steps and certain features of construction, and a combination of parts hereinafter fully described, illustrated in the accompanying drawings, and particularly pointed out in the appended claims, it being understood that various changes in the steps and in the form, proportion, size, and minor details of the structure may be made without departing from the spirit or sacrificing any of the advantages of the invention.

BRIEF DESCRIPTION OF THE DRAWINGS

For the purpose of facilitating an understanding of the invention, there is illustrated in the accompanying drawings preferred embodiments thereof, from an inspection of which, when considered in connection with the following description, the invention, its mode of construction, assembly and operation, and many of its advantages should be readily understood and appreciated.

FIG. 4 is a top plan view of the handle in condition to be attached to the utensil;

FIG. 5 is a view in vertical section of the handle taken along the lines 5—5 of FIG. 4;

FIG. 6 is a view in vertical section taken along the line 6—6 of FIG. 5;

FIG. 7 is a fragmentary view of the kitchen utensil and the handle when detachably secured together;

FIG. 8 is a fragmentary view of the handle and illustrating the manner in which it may be used to move an oven rack;

FIG. 9 illustrates a second form of the bracket which may be used on the utensil;

FIG. 10 illustrates a modification of the receptacle on the handle so as to accommodate the wire bracket illustrated in FIG. 9;

FIG. 11 illustrates a view in vertical section of a second embodiment of the invention, with the handle cover closed;

FIG. 12 illustrates the embodiment of FIG. 11 with the cover in the open position thereof;

FIG. 13 is a view in vertical section taken along the line of 13—13 of FIG. 12;

FIG. 14 illustrates a third embodiment of the detachable handle;

FIG. 15 is a view in vertical section on an enlarged scale taken along the line 15—15 of FIG. 14;

FIG. 16 is a view in vertical section taken along the line 16—16 of FIG. 15; and FIG. 17 is a view like FIG. 15, but with the cover in its open position.

DETAILED DESCRIPTION OF THE PREFERRED EMBODIMENTS

Figure 1:
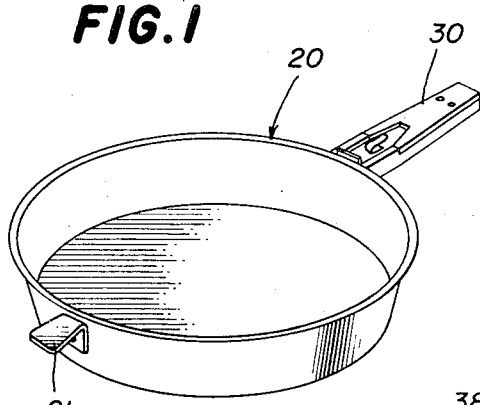
FIG. 1 illustrates a cooking utensil with a handle detachably mounted thereon which handle incorporates therein the features of the present invention.

Turning now to the drawings and more particularly to FIG. 1 thereof, there is illustrated a cooking utensil which in the form illustrated is a frying pan 20. Secured to the frying pan 20 at diametrically opposite points thereon is a pair of brackets 21, each including a plate-like projection 22 (FIG. 3) and a depending flange 23. The flange 23 of each of the brackets 21 is secured to the side wall of the frying pan 20 by rivets or the like. As is best seen in FIG. 3, the projection 22 has a trapezoidal shape, including a pair of side walls 24 which flare outwardly.

Figure 2:
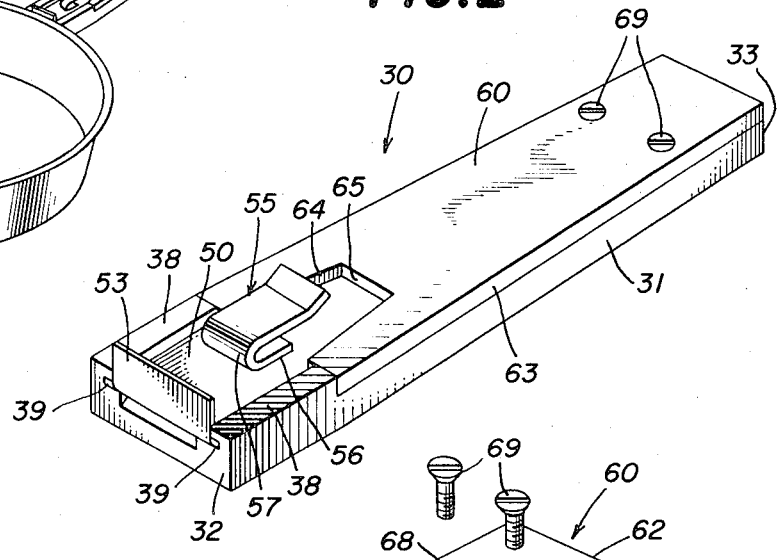
FIG. 2 is a perspective view on an enlarged scale of the hanlde in FIG. 1.
Figure 3:
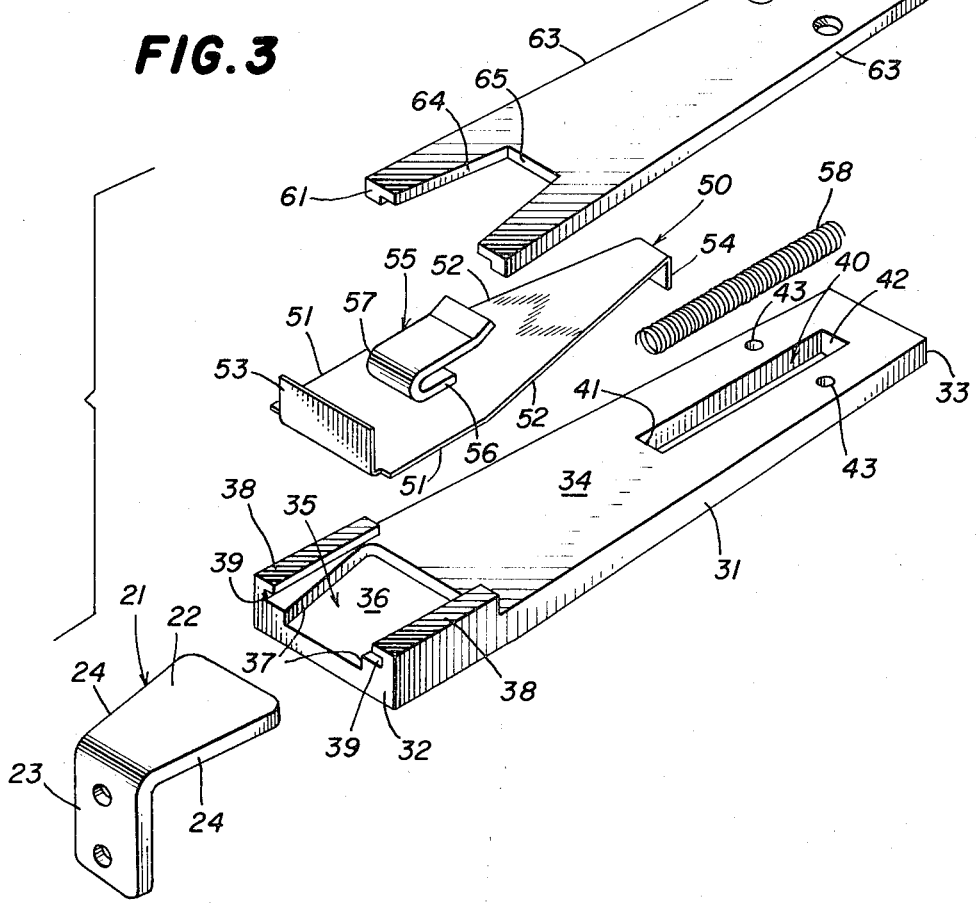
FIG. 3 is an exploded view of the handle in FIG. 2 and illustrating one of the brackets on the cooking utensil.

Turning now to FIGS. 2 and 3, there is illustrated a handle 30 incorporating therein the features of the present invention. The handle 30 includes an elongated plate-like body 31 having a front end 32 and a rear end 33. Formed near the front end 32 in the top surface 34 of the body 31 is a receptacle 35, which receptacle is defined by a floor 36 and forwardly-tapered side walls 37. The receptacle 35 has a shape substantially identical to the shape of the projection 22 on the bracket 21, but is slightly larger so as to be able to receive such projection 22. The front of the receptacle 35 defines a mouth therefor. The top of the receptacle 35 defines an entry by which the projection 22 may enter into the receptacle 35.

Adjacent the receptacle 35 on either side thereof is a pair of rails 38 which are spaced from the top surface 34, whereby a guide is formed between the rails 38 and such surface 34. An elongated channel 40 is provided in the body 31 adjacent to the rear thereof, which extends along the elongation of the body 31. The front end of the channel 40 defines a front shoulder 41, and the rear end thereof defines a rear shoulder 42. Finally, there is provided a pair of holes 43 respectively on either side of the channel 40.

The handle 30 also comprises a plate-like cover 50 having parallel edges 51 adjacent to the front thereof and rearwardly-tapered edges 52 adjacent to the rear thereof. At the front of the cover 50 there is provided an upwardly-directed lip 53, and at the rear of the cover 50 there is provided a depending finger 54. On top of the cover 50 a thumb grip 55 is provided which is basically U-shaped in cross section and has an attachment flange 56 that is welded, for example, to the cover 50. The bight 57 of the grip 55 provides a surface against which the thumb can push the cover 50 rearwardly.

The cover 50 rests on the top surface 34 of the body 31, with the finger 54 riding inside the channel 40. The edges 51 of the cover 50 are arranged in the guide 39 defined by the rails 38. There is a slight clearance, of course, between the rails 38 and the cover 50, so that the cover 50 can easily slide therebetween. A compression spring 58 is in the channel 40 between the rear shoulder 42 and the rear of the finger 54. Thus, the spring urges the cover 50 forwardly, so that the front thereof covers the entry to the receptacle 35.

The handle 30 also comprises a plate-like escutcheon 60 which has front and rear edges 61 and 62 and rearwardly-tapered side edges 63. A cutout 64 is provided in the escutcheon 60 within which the thumb grip 55 can move forwardly and rearwardly. The rear of the cutout 64 defines an abutment 65 against which the rear edge of the flange 56 can abut to limit rearward movement of the cover 50. In the embodiment shown, the sides of the lip 53 will contact the front edge 61 of the escutcheon 60 so as to provide an additional limit for the cover 50. It is to be understood that either one or both limits can be utilized. The bottom surface 66 of the escutcheon 60 has a recess 67 therein which recess is defined by parallel edges near the front and tapering rear edges near the rear. The recess 67 has a depth approximately equal to the thickness of the cover 50, whereby the bottom surface 66 of the escutcheon 60 and the cover 50 rest on the top surface 34 of the body 31. The parallel edges of the recess 67 coact with the parallel edges 51 of the cover 50 to provide an additional guide means for such cover. Holes 68 in the escutcheon 60 are aligned with the corresponding holes 43 in the body 31, through which holes pass screws 69 to secure the escutcheon 60 to the body 31, thereby retaining the cover 50 and the spring 58 in place.

In operation, the user who wishes to attach the handle 30 to the frying pan 20 grasps the handle 30 in one hand and places his thumb on the finger grip 55, as illustrated in FIG. 5. By pushing rearwardly at the bight 57, the cover 50 is slid rearwardly against the action of the spring 58 and guided primarily by the guide 39 and secondarily by the parallel edges of the recess 67 in the escutcheon 60. Rearward movement of the cover 50 is limited by the engagement of the sides of the lip 53 with the front edge 61 of the escutcheon 60 and also by the engagement of the rear of the flange 56 and the abutment 65 of the cutout 64.

The rearward motion of the cover 50 just described places it in its open position so as to expose the interior of the receptacle 35. Holding it in this position, the user approaches the frying pan 20 and places the handle 30, so that the receptacle 35 is immediately beneath and vertically aligned with the projection 22 of one of the brackets 21 on the frying pan 20. The user then raises the handle 30 until the selected projection 22 is seated within the receptacle 35. The cover 50 is released, whereupon it will snap forwardly by virtue of the action of the spring 58, thereby placing the cover 50 in its closed position with respect to the receptacle 35. Forward movement of the cover 50 is limited by engagement of the finger 54 with the front shoulder 41 in the channel 40. The tapered shape of the projection 22 coacts with the flared shape of the receptacle 35, so that the projection 22 cannot be withdrawn from the receptacle 35 by way of its mouth. The cover 50, being in its closed position, prevents the projection 22 from being withdrawn from the receptacle 35 by way of the entry thereto in the top surface 34. Because the projection 22 is constructed to conform very closely to the shape of the receptacle 35, the attachment is very secure and there is very little, if any, wobble. The attachment is so secure that the frying pan 20 may be turned over to remove the contents thereof or for any other purpose.

Also, the attachment procedure is accomplished with the use of only one hand, which is the hand that holds the handle 30. The user need not have a glove, pot holder, etc. to hold the frying pan 20 while attaching the handle 30. Because virtually no force is applied to the frying pan itself by carefully seating the projection 22 in the receptacle 35, the frying pan 20 does not move so as to shift the food therein or cause splattering, etc.

Of course, because the handle 30 is detachable, it is not left with the frying pan on the stove and therefore will not be heated. When the cook is ready to remove the frying pan 20, she takes the handle 30 and attaches it in the manner previously described. The handle, of course, is cool and therefore may be grasped without the aid of a glove or the like.

After the frying pan 20 has been placed on the stove, the handle 30 is removed again by placing one's finger on the finger grip 55, moving the cover 50 back to expose the receptacle 35 and the projection 22 therein. The handle 30 is then lowered to disengage it from the projection 22. The cover 50 is then released whereupon it snaps back to its closed position by virtue of the action of the spring 58. The handle 30 is then put away for future use. When it is desired to remove the frying pan 20, the user takes the handle 30 and manipulates it in the way previously described to attach it to the frying pan 20 whereupon it can be removed from the stove and used in the normal way in which a frying pan is used.

Although the utensil to which the handle 30 is attached has been described as being a frying pan 20, it is to be understood that the invention may be utilized with any kind of cooking utensil or, in fact, any utensil at all. For example, the kitchen utensil can be a casserole dish, in which case the provision of two brackets 21 at diametrically-opposed points renders the utensil more attractive and enables it to be used on the eating table. Thus, such a casserole dish, after having been removed from the oven by attaching the handle 30, can be placed directly on the eating table, whereupon the handle 30 is detached.

Although the handle 30 is shown to have a box-like shape, it can be constructed to have hand-fitting contours. The lip 53 is provided as a means to hook onto a rack in the oven to move it in or out. The handle 30 is constructed of a material to enale it to be immersible in water, so as to be cleaned along with other utensils. The body 31 may be made of lightweight, heat-resistant plastic, although other materials such as cast aluminum, can be used. The cover 50 may be constructed of a noncorroding type of metal, such as stainless steel or chromium-plated steel.

Turning now to FIGS. 9 and 10, an alternative form of the invention will be described. In this form, the bracket 80 is in the form of a wire loop having diverging arms 81, depending legs 82 which are welded, for example, to the side of the frying pan 20. The bracket 80 also includes a cross member between the outer ends of the arms 81.

The handle 30 is modified by providing a groove 85 in the floor 36 of the receptacle 35, which groove 85 has a shape complementary to the shape of the projection on the bracket 80. The arch-shaped groove 85 includes two forwardly-converging portions 86 respectively to receive the arms 81 and a cross portion 86 to receive the cross member 83. When the cover 50 is placed in its open position, the projection of the bracket 80 is seated in the groove 85, whereupon the cover 50 is allowed to snap shut in the same manner described with respect to the first embodiment. The bracket 80 may be mounted on a variety of utensils other than pans.

Turning now to FIGS. 11 to 13, a further embodiment of the present invention will be descirbed. For the sake of simplicity, those elements in the instant form corresponding to elements in the form of FIGS. 1 to 8 will be labeled with the same reference numerals but in 100 series. The handle 130 illustrated includes a body 131 constructed basically like the body 31 of the first form. The body 131 has a receptacle 135 similar to the receptacle 35. There is also formed in the body 131 an elongated channel 140 located approximately centrally in the body 131. The channel 140 has a front wall 141 at the front thereof and a rear shoulder 142 at the rear. There is provided a circular tube 144 which has a length approximately two-thirds the length of the channel 140 and mounted therein against the front wall 141, the rear of the tube 144 defining a shoulder 145. A spring 158 is positioned within the tube 144, having one end thereof attached to the front wall 141 and having the other end thereof attached to the finger 154 on the cover 150. The spring 158 is in tension and pulls the spring 158 forwardly against the front shoulder 145 which, in turn, places the cover 150 in the closed position thereof shown in FIG. 11. In such closed position, the receptacle 135 is covered in essentially the same way as the receptacle 35 was covered in the first form. The cover 150 is movable rearwardly against the action of the spring 158 to the position illustrated in FIG. 12 to place the cover 150 in its open position and thereby expose the receptacle 135. Rearward movement of the cover 150 is limited by the engagement of the finger 154 with the rear shoulder 142. Release of the cover 150 will cause it automatically to return to its normally closed position.

Turning now to FIGS. 14 to 16, another form of the invention is illustrated, wherein elements corresponding to those in the first embodiment are labeled with corresponding reference numerals in the 200 series. The handle 230 includes a body 231 which is elongated and has at the front end thereof a receptacle 235 constructed like the receptacle 35 of the first embodiment. There is provided an elongated longitudinally-extending channel 240 having a front shoulder 241 and a rear shoulder 242. A longitudinally-extending bore 244 is provided in the body 231, directed rearwardly from the rear shoulder 242. There is also provided a cover 250 which is substantially the same as the cover 50, but includes a longitudinally-extending, elongated slot 259. A pin 280 having a head 281 extends through the slot 259 and into the body 231 to which it is permanently affixed. The pin 280 provides an additional guide means which, along with the guide 239 defined by the rails 238, provides a means by which the cover 250 is guided as it is moved between its open and closed positions. A spring 258 is arranged in the channel 240 and partially in the bore 244 in which it is retained. The spring 258 is of the compression type so as to urge the finger 254 forwardly and against the front shoulder 241. This constitutes the closed position of the cover 250 whereby the receptacle 235 is closed. In order to open the receptacle 235, the cover 250 is moved rearwardly against the action of the spring 258 to the position illustrated in FIG. 17. When the projection on the kitchen utensil is seated within the receptacle 235 in much the same way as described with respect to the first embodiment, the cover 250 is released, whereupon it will snap back to its closed position by virtue of the action of the spring 258 so as firmly to interconnect the handle 230 onto the kitchen utensil. In the form illustrated in FIGS. 14 to 17, no escutcheon is provided, whereby the cover 250 is retained in position by virtue of the headed pin 280, and the spring 258 is retained in position by the bore 244. However, it is to be understood that an escutcheon similar to the escutcheon 60 could be provided if desired.

It is believed that the invention, its mode of construction and assembly, and many of its advantages should be readily understood from the foregoing without further description, and it should also be manifest that, while preferred embodiments of the invention have been shown and described for illustrative purposes, the structural details are, nevertheless, capable of wide variation within the purview of the invention as defined in the appended claims.

What is claimed is:

1. In combination with a projection in the form of a loop for attaching to a utensil, a detachable handle comprising an elongated body, said body including therein a receptacle adjacent one end thereof for removably receiving said projection, said receptacle having a mouth at said one end and a laterally-directed entry to accommodate movement of said projection into and out of said receptacle, said receptacle having means defining a groove for receiving said loop, and a cover movable between open and closed positions with respect to said entry, said projection and said body including means for preventing withdrawal of said projection from said receptacle through said mouth, whereby moving said cover to the open position thereof enables seating of said projection in said receptacle so as to protrude from said mouth, and thereafter placing said cover in the closed position thereof causes capture of said projection in said receptacle detachably to lock said handle onto the utensil.

2. In combination with a projection for attaching to a utensil, a detachable handle comprising an elongated body, said body including therein a longitudinally-elongated cavity and a receptacle adjacent one end of said body for removably receiving said projection, said receptacle having a mouth at said one end and a laterally-directed entry to accommodate movement of said projection into and out of said receptacle, guide means on said body, a cover slidably carried by said guide means and longitudinally slidable toward and away from said one end respectively to open and closed positions with respect to said entry, and a spring in said cavity and resiliently urging said cover to the closed position thereof, said projection and said body including means for preventing withdrawal of said projection from said receptacle through said mouth, whereby moving said cover against the biasing of said spring to the open position thereof enables seating of said projection in said receptacle so as to protrude from said mouth, and thereafter placing said cover in the closed position thereof causes capture of said projection in said receptacle detachably to lock said handle onto the utensil.

3. The combination set forth in claim 2 wherein said guide means includes a longitudinally-extending slot in said cover plate and a pin extending through said slot and into said body.

4. The combination set forth in claim 2 wherein said channel has at the end nearest said one end of said body a first shoulder and at the end farthest from said one end a second shoulder, said cover having a depending finger disposed in said channel and longitudinally movable therein between said shoulders, said spring being in compression and being disposed between said finger and said second shoulder for resiliently pushing said finger toward said first shoulder.

5. The combination set forth in claim 2 wherein said channel has at the end nearest said one end of said body a first shoulder and at the end farthest from said one end a second shoulder, said cover having a depending finger disposed in said channel and longitudinally movable therein between said shoulders, said spring being in tension and pulling said finger toward said first shoulder.

6. The combination set forth in claim 2 and further comprising an escutcheon plate secured to said body to conceal said cavity and said spring therein.

7. In combination with a projection for attaching to a utensil, a detachable handle comprising an elongated body, said body including therein a longitudinally-elongated cavity and a receptacle adjacent one end of said body for removably receiving said projection, said receptacle having a mouth at said one end and a laterally-directed entry to accommodate movement of said projection into and out of said receptacle, guide means on said body, a cover slidably carried by said guide means and longitudinally slidable toward and away from said one end respectively to open and closed positions with respect to said entry, and biasing means in said cavity and resiliently urging said cover to the closed position thereof, said projection and said body including means for preventing withdrawal of said projection from said receptacle through said mouth, whereby moving said cover against the biasing of said biasing means to the open position thereof enables seating of said projection in said receptacle so as to protrude from said mouth, and thereafter placing said cover in the closed position thereof causes capture of said projection in said receptacle detachably to lock said handle onto the utensil.

8. In combination with a projection which flares outwardly and which is adapted to be attached to a utensil, a detachable handle comprising an elongated body, said body including therein a receptacle adjacent one end thereof for removably receiving said projection, said receptacle having a mouth at said one end and a laterally-directed entry to accommodate movement of said projection into and out of said receptacle, and a cover member movable between open and closed positions with respect to said entry, said receptacle having a floor and being tapered toward said one end and matching the shape of said projection, said projection being insertable in said receptacle to rest on the floor thereof, the flared shape of said projection and the tapered shape of said receptacle cooperating to prevent withdrawal of said projection, whereby moving said cover to the open position thereof enables seating of said projection in said receptacle on said floor thereof so as to protrude from said mouth, and thereafter placing said cover in the closed position thereof causes capture of said projection in said receptacle detachably to lock said handle onto the utensil.

* * * * *